J. F. ANVELINK.
PAIL COVER AND STRAINER.
APPLICATION FILED JAN. 19, 1918.
1,312,428.
Patented Aug. 5, 1919.
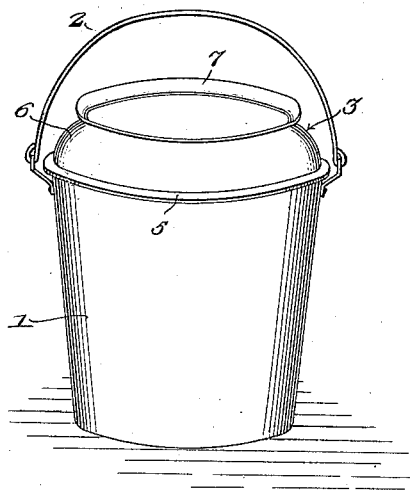
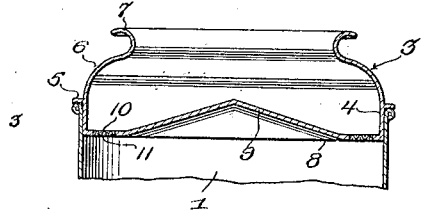
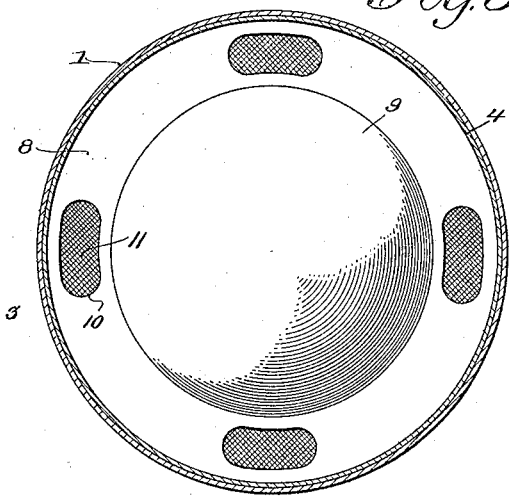
WITNESSES
JHCrawford
INVENTOR
J.F.Anvelink,
BY Victor J. Evans
ATTORNEY 1,312,428.

UNITED STATES PATENT OFFICE.

JOHN F. ANVELINK, OF SHAWANO, WISCONSIN.

PAIL COVER AND STRAINER.

Specification of Letters Patent. Patented Aug. 5, 1919.

Application filed January 19, 1918. Serial No. 212,718.

*To all whom it may concern:*

Be it known that I, JOHN F. ANVELINK, a citizen of the United States, residing at Shawano, in the county of Shawano and State of Wisconsin, have invented new and useful Improvements in Pail Covers and Strainers, of which the following is a specification.

This invention relates to a combined cover and strainer for milk pails, and has for its object to produce a device of this character that will render the pail sanitary without sacrificing the utility thereof.

Another object of the invention is to produce a removable cover and strainer for milk pails, of a construction whereby the milk may be freely delivered therein, and prevented from splashing, and delivered in a strained condition into the pail.

It is a further object of the invention to produce a cover and strainer for milk pails which shall be of a simple construction, cheap to manufacture, one which may be readily applied to or removed from the pail and which may be easily cleaned after use.

Other objects and advantages will present themselves as the nature of the invention is better understood, reference being had to the accompanying drawings, in which—

Figure 1 is a perspective view of a milk pail provided with my improvement,

Fig. 2 is an approximately central vertical longitudinal sectional view through the same, Fig. 3 is a horizontal sectional view approximately on the line 3—3 of Fig. 2, upon an enlarged scale.

The pail 1 is of the ordinary construction, being provided, at its upper edge with the usual bail or handle 2.

The improved cover and strainer is broadly indicated by the numeral 3, the same, at the lower portion thereof being in the nature of a cylinder 4, and the upper edge of the cylindrical portion is formed with an outturned continuous flange 5. The portion 4 is designed to be received in the mouth of the pail 1, and the flange 5 is designed to rest on the top of the said pail, both the flange and the lower portion 4 contacting with the pail. From the flange 5, the top 3 is provided with an upwardly and inwardly flared portion 6 that has its outer edge rounded outwardly or provided with a continuous bead 7. The bottom of the top member 3, at its juncture with the portion 4 may be straight for a determined distance, as indicated by the numeral 8, but the center of the bottom is in the shape of an upwardly extending cone 9. The straight annular portion 8 of the bottom, at suitable intervals is provided with preferably elongated openings 10, and these openings are covered by reticulated plates 11.

The mouth of the cover and strainer 3 is sufficiently large to permit of the device being arranged upon the pail in milking. The milk will contact with the cone shaped portion 9 of the bottom, directing the same toward the straight portion 8 thereof and through the reticulated plates 11 into openings 10, thus straining the milk before the same is delivered into the pail. The inwardly flared sides 6 at the upper portion of the top member 3 prevents the milk from splashing outward of the device, and it is believed, from the foregoing description, when taken in connection with the drawings that the simplicity and advantages of the construction will be apparent without further detailed description.

What I claim is:

1. A cover for milk pails, comprising a member having a flat annular base, a side rising from the periphery of the flat annular part of the base, said side having its outer portion rounded inwardly and turned outwardly near the mouth thereof, said base being centrally raised from the under face thereof to provide an inwardly projecting cone, the apex of which is disposed below the mouth of the cover, the base between the cone-shaped center thereof and the side of the cover having screened openings.

2. A pail cover and strainer comprising a bottom wall having an annular portion with a screened opening and also having a central raised portion, a side wall extending upwardly from the annular portion of the bottom wall and having an exterior support, a guard portion forming a continuation of and curved inwardly and upwardly from the side wall to overhang the annular portion of the bottom wall, and an integral, reduced mouthpiece terminating in an outwardly extending flange and adapted to receive the fingers of the user for the removal of the cover and strainer.

In testimony whereof I affix my signature.

Mr. JOHN F. ANVELINK.

Copies of this patent may be obtained for five cents each, by addressing the "Commissioner of Patents, Washington, D. C."